(12) United States Patent
Chang et al.

(10) Patent No.: US 8,713,239 B2
(45) Date of Patent: Apr. 29, 2014

(54) BUS CONTROLLER FOR HANDLING SPLIT TRANSACTIONS

(75) Inventors: Yeow Khai Chang, Singapore (SG);
Weng Fei Moo, Singapore (SG)

(73) Assignee: NXP B.V., Eindhoven (NL)

( * ) Notice: Subject to any disclaimer, the term of this patent is extended or adjusted under 35 U.S.C. 154(b) by 1067 days.

(21) Appl. No.: 11/629,728

(22) PCT Filed: Jun. 9, 2005

(86) PCT No.: PCT/IB2005/051888
§ 371 (c)(1),
(2), (4) Date: Dec. 15, 2006

(87) PCT Pub. No.: WO2005/125093
PCT Pub. Date: Dec. 29, 2005

(65) Prior Publication Data
US 2007/0208895 A1    Sep. 6, 2007

(30) Foreign Application Priority Data

Jun. 15, 2004  (EP) .................................... 04102725

(51) Int. Cl.
*G06F 13/38* (2006.01)
*G06F 13/40* (2006.01)
*G06F 13/42* (2006.01)

(52) U.S. Cl.
CPC .......... *G06F 13/385* (2013.01); *G06F 13/4018* (2013.01); *G06F 13/4045* (2013.01); *G06F 13/4282* (2013.01)
USPC ................. 710/313; 710/33; 710/52; 710/66; 710/107; 710/315

(58) Field of Classification Search
USPC .......................................... 710/105, 107, 110
See application file for complete search history.

(56) References Cited

U.S. PATENT DOCUMENTS

| | | | |
|---|---|---|---|
| 6,742,076 B2 * | 5/2004 | Wang et al. | 710/314 |
| 6,771,664 B1 * | 8/2004 | Garney et al. | 370/474 |
| 6,792,495 B1 * | 9/2004 | Garney et al. | 710/305 |
| 6,813,251 B1 * | 11/2004 | Garney et al. | 370/257 |
| 6,868,469 B2 * | 3/2005 | Bennett et al. | 710/306 |
| 6,889,265 B2 * | 5/2005 | Garney et al. | 710/18 |
| 6,912,651 B1 * | 6/2005 | Hamdi et al. | 713/1 |
| 6,952,429 B2 * | 10/2005 | Garney et al. | 370/474 |
| 7,007,119 B2 * | 2/2006 | Howard et al. | 710/100 |

(Continued)

FOREIGN PATENT DOCUMENTS

| | | | |
|---|---|---|---|
| JP | 2003-150534 A | 5/2003 |
| JP | 2004-110619 A | 4/2004 |

OTHER PUBLICATIONS

Compaq et al.; "Universal Serial Bus Specification"; Revision 2.0; Apr. 27, 200; p. 374.*

(Continued)

*Primary Examiner* — Ryan Stiglic (57) ABSTRACT

A host controller is suitable for transferring data in transactions, each transaction being described by a transfer descriptor, and the transactions include split transactions. The transfer descriptor for a split transaction includes a bit which may be set to indicate whether the split transaction is a start split or a complete split transaction, and, once a transaction comprising split transactions has been started by a first split transaction, subsequent split transactions are generated automatically until the transaction is complete.

15 Claims, 11 Drawing Sheets

(56) References Cited

U.S. PATENT DOCUMENTS

| | | | |
|---|---|---|---|
| 7,149,833 B2* | 12/2006 | McLeod | 710/300 |
| 7,194,583 B2* | 3/2007 | Hesse et al. | 711/137 |
| 2002/0116565 A1* | 8/2002 | Wang et al. | 710/313 |
| 2002/0116566 A1* | 8/2002 | Saida | 710/313 |
| 2002/0144031 A1* | 10/2002 | Garney et al. | 710/60 |
| 2002/0144042 A1 | 10/2002 | Garney | |
| 2003/0065839 A1* | 4/2003 | Howard et al. | 710/100 |
| 2004/0030840 A1* | 2/2004 | Hesse et al. | 711/137 |
| 2004/0268010 A1* | 12/2004 | Garney et al. | 710/310 |
| 2005/0033892 A1* | 2/2005 | Garney et al. | 710/306 |
| 2005/0033896 A1* | 2/2005 | Wang et al. | 710/314 |
| 2007/0011386 A1* | 1/2007 | Ng et al. | 710/305 |
| 2007/0208896 A1* | 9/2007 | Chang et al. | 710/260 |

OTHER PUBLICATIONS

Intel; "Enhanced Host Controller Interface Specification for Universal Serial Bus"; Intel; Revision 1.0; Mar. 12, 2002; pp. 1, 31, 36-44.*
Froelich, Dan; "High Speed Protocol Additions"; Intel; Jun. 12, 2002; all pages.*
Anderson, Don; "USB System Architecture"; Mindshare Inc.; 2001; pp. 291-292.*
Axelson, Jan; USB Complete; Lakeview Research LLC; Third Edition; Aug. 1, 2005; pp. 433-453.*
Compaq et al.; "Universal Serial Bus Specification"; Apr. 27, 2000; Revision 2.0; pp. 199-205, 342-382.*

* cited by examiner

QHAS/C_split PTD

| Bits | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|---|
| | X | | | | MaximumPacketSize | | | | | | | | | | | NBytesToTransfer | | | | | | | | | | | | | X | X | V | W0 (31-0) |
| | X | X | | | RL | | | X | | | | | | | | Data Start Address | | | | | | | | | | | | X | | | | W1 (31-0) |
| | X | X | | | X | X | | X | | X | | X | | X | | X | | X | | X | | X | | X | | J | X | Next TD pointer | | | | W2 (31-0) |
| | X | | | | | | | X | | | | | | | | | | | | X | | | | | | | | | X | | | W3 (31-0) |

| Bits | 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 | |
|---|---|---|---|---|---|---|---|---|---|---|---|---|---|---|---|---|---|---|---|---|---|---|---|---|---|---|---|---|---|---|---|---|---|
| | Hub Address | | | | | | | PortNumber | | | | | | | | SE | X | S | EP Type | | Token | | | Device Address | | | | | | 34-31 EndPt | | W0 (63-32) |
| | A | H | B | Xtr | S | dt | Ceer | | NakCnt | | | | | | | X | X | X | X | X | NBytesTransferred (43-32, 12bits, 4K, for FS/LSpeed only) | | | | | | | | | | | W1 (63-32) |
| | X | | | | C | | | | | | | | | | | X | | | | | | | | X | | | | | | | | W2 (63-32) |
| | | | | | | X | | | | | | | | | | | | | | | | | | | | | X | | | | | W3 (63-32) |

FIG.4

| Bit | Name | R/W | Description |
|---|---|---|---|
| W0 | | | |
| 0 | V | HW/SW | 1 : S/W updates to 1 when there Payload is to be sent/received even across ms boundary. The current PTD is active.<br>0 : this bit is deactivated when the entire PTD is executed (across usof or Sof) or when an fatal error is encounter |
| 1 | X | | X |
| 2 | X | | X |
| 3-14 | NrBytesToTransfer (11 downto 0) | S/W writes | This field indicates how many bytes can be transferred by this data structure. It is used to indicate the depth of the DATA field. (4k bytes) |
| 18-28 | Maximum Packet length (10:0) | SW writes | This field indicates the maximum number of bytes that can be sent to or received from the endpoint in a single data packet. MPS for bulk is ~~512~~ 64.<br>Max is the 1023 for iso.<br>Max packet for iso is also variable at any whole number. |
| 29-30 | X | SW writes | N.A, X |
| 31-34 | EndPt(3:0) | SW writes | This is the USB address of the endpoint within the function (place up to 16 endpoint in 1 uSOF/msec) |
| 35-41 | Device Address(6:0) | SW writes | This is the USB address of the function containing the endpoint that this buffer refers to. |
| 42-43 | Token(1:0) | SW writes | Token PID for this transaction<br>00b: OUT<br>01b: IN<br>10b: SETUP<br>11b: PING (N.A) |
| 44-45 | EPType(1:0) | SW writes | Transaction Type<br>00b: control<br>01b: Isochronous<br>10b: Bulk<br>11b: interrupt |
| 46 | S | SW writes | 0: HS transaction<br>1: Split transaction |
| 47 | X | SW | X |
| 48-49 | SE(1:0) | HW | Bulk  Iso  Int  Control  S  E<br>             I/O  I/O    1  0  LS<br>I/O  I/O  I/O  I/O       0  0  FS<br>I/O  I/O  I/O  I/O       0  0  HS |
| 50-56 | Port Number(6:0) | SW | Port number of the HUB or embedded TT |
| 57-63 | Hub Address (6:0) | SW | Hub address(0 for internal/Embedded hub) |
| End of W0 | | | |

FIG.5a

| W1 | | | |
|---|---|---|---|
| 0-7 | X | SW writes | X |
| 8-23 | Data Start Address(15:0) | SW writes | This is the start address for the data that will be sent/received on /from the USB bus.<br>This Address written by S/W is the address of the Build-in memory NOT THE CPU ADDRESS. |
| 24 | X | SW | X |
| 25-28 | RL | SW | If RL is 0, the H/W ignore the NakCnt value! These two values set to same before transaction. |
| 29 | X | | X (for SiTD) |
| 30 | X | | X (for SiTD) |
| 31 | X | | X(for SiTD) |
| 32-43 | NrBytesTransferred(11:0) | HW updates | This field indicates how many bytes are sent or received for this transaction. If Mult is greater than one, then it is possible to store intermediate results in this field. |
| 44-46 | NrBytesTransferred(12:14) | | Extend MSB to increased NrBytesTransferred to possible32K per PTD. |
| 44-50 | S-bytes(6:0) | | X |
| 51-54 | NakCnt | | V bit reset if Nakcnt decrement to 0 and RL is non 0. |
| 55-56 | Cerr (1:0) | | Error Count for Start and Complete Split, QHASS.<br>On error conditions of no response, bad response,<br>Cerr will be decremented until ZERO and then valid set to 0. A NAK or NYET will reset this Cerr. EHCI spec 4.12.1.2<br>***** If retry has insufficient time, at the beginning of the new SOF, the first PTD must be this RETRY. This can be accomplished by not advancing the aperiodic PTD. |
| 57 | Dt | | Data Toggle bit |
| 58 | X | | X |
| 59 | SC | SW write 0, HW update | 0: Start Split<br>1: Complete Split |
| 60 | Xtr | | Transaction Error |
| 61 | B | | Babbling bit |
| 62 | H | | Halt bit |
| 63 | A | | Active bit |
| End of W1 | | | |
| W2 | | | |
| 0-4 | Next PTD pointer | SW write | Next PTD Branching assigned by PTD pointer |
| 5 | J | SW write | '1' to enable next PTD branching,<br>'0' to increment PTD pointer |

FIG.5b

SiTD, ISO OUT/IN Start/Complete Split

| Bits | Field | Word |
|---|---|---|
| 31: X, 2: X, 1: X, 0: V | | W0 (31-0) |
| 30-0: NBytesToTransfer | | W0 (31-0) |
| W1 (31-0): Data Start Address | | W1 (31-0) |
| W2 (31-0): BP/SS, C/CS, S/SE, RL (no ping for FS), Ex, TT_MPS_Len, Frame Number Bit [7:3] (FS/LS) | | W2 (31-0) |
| W3 (31-0): Status[2:0] usof7/usof6/usof5/usof4/usof3/usof2/usof1/usof0 — ss7..ss0 — cs7..cs0 | | W3 (31-0) |
| NBytesReceived_CS_IN_6, CS_IN_5, CS_IN_4, CS_IN_3 | | |
| W0 (63-32): A, H, B, Xtr, SC, P/dt, E, Ceer, Hub Address, PortNumber, XX, L, S, EP Type, Token, Device Address, EndPt | | W0 (63-32) |
| W1 (63-32): NakCnt (no need for SITD), S-Bytes for QHPSplit (no need for SITD), NBytesTransferred | | W1 (63-32) |
| W2 (63-32): NBytesReceived_CS_IN_2, CS_IN_1, CS_IN_0 | | W2 (63-32) |
| W3 (63-32): us/cs 7..0, NBytesReceived_CS_IN_7 | | W3 (63-32) |

FIG. 6

| Bit | Name | R/W | Description |
|---|---|---|---|
| W0 | | | |
| 0 | V | SW/HW | 1 : S/W updates to 1 when there Payload is to be sent/received even across ms boundary. The current PTD is active.<br>0 : this bit is deactivated when the entire PTD is executed (across usof or Sof) or when an fatal error is encounter |
| 1 | X | | X |
| 2 | X | | X |
| 3-14 | NrBytesToTransfer (11 downto 0) | S/W writes | This field indicates how many bytes can be transferred by this data structure. It is used to indicate the depth of the DATA field. This field is 1023 in SiTD, the max allowable payload for ISO FS device.<br>Indirectly this field becomes the MPS of the downstream device. |
| 18-28 | TT_MPS_Len (10:0) | SW writes | For OUT ISO only.<br>This field indicates the maximum number of bytes that can be sent per Start Split depending on the number of total byte needed. If the Total Bytes to be send for the entire ms is greater than 188. Then this field should be 188. Else this field should be equal to the total bytes send if it is smaller than 188. |
| 29-30 | X | SW writes | N.A, X |
| 31-34 | EndPt(3:0) | SW writes | This is the USB address of the endpoint within the function (place up to 16 endpoint in 1 uSOF/msec) |
| 35-41 | Device Address(6:0) | SW writes | This is the USB address of the function containing the endpoint that this buffer refers to. |
| 42-43 | Token(1:0) | SW writes | Token PID for this transaction<br>00b: OUT<br>01b: IN<br>10b: SETUP<br>11b: PING (N.A) |
| 44-45 | EPType(1:0) | SW writes | Transaction Type<br>00b: control<br>01b: Isochronous<br>10b: Bulk<br>11b: interrupt |
| 46 | S | SW writes | 0: HS transaction<br>1: Split transaction |
| 47 | X | SW | X the transfer. |
| 48-49 | XX SE(1:0) | SW | This SE value for every usof send out for the OUT ISO is done internally by H/W. |
| 50-56 | Port Number(6:0) | SW | 00, N.A. INT |
| 57-63 | Hub Address (6:0) | SW | 00, N.A. for INT |
| End of W0 | | | |

FIG.7a

| W1 | | | |
|---|---|---|---|
| 0-7 | Uframe (7:0) | SW writes | ISO: BIT 7: 3 DETERMINE WHICH FRAME TO EXECUTE<br>INT: BIT 7: 3 IS THE MS POLLING RATE<br>polling rate is , 2**(b −1) usof, where b is 4 to 16.<br>WHEN B IS 4, EVERY MS IS EXECUTED<br>   B   RATE   BIT7:3<br>•   2     00001<br>•   4     00010/0 0011<br>•   8     00100/00101<br>•   16   01000/01001  UP TO 32 MS |
| 8-23 | Data Start Address(15:0) | SW writes | This is the start address for the data that will be sent/received on /from the USB bus.<br>This Address written by S/W is the address of the Build-in memory NOT THE CPU ADDRESS. |
| 24 | Ex | SW | This single bit is for ISO for 1 usof, when ISO for the usof is executed this bit will be set. This has been replaced by the USA(7:0) for 8 usof.<br><br>Now, this is NOT used in ISO |
| 25-28 | RL | SW | Set to 000, N.A for ISO |
| 29 | CSE | | CS and SS executed. This bit is set if there is both CS and SS transaction executed to the same isochronous endpoint |
| 30 | ECS | | Execute CS and SS. This is used for split isochronous transactions to differentiate between case 2a and 2b. This bit can only be set if only BPS is set. This means that a split transaction has to be executed if the result of the complete transaction is that the Active bit of the Back pointer must be cleared. |
| 31 | BPS (T-bit) | | Back Pointer Status. This bit is only used for siTDs. If set then the status information in this word corresponds to the data structure referenced by the Back pointer.<br>Since transactions are send out using frame number , the transaction has to be send out with both uframe and uframe+1. At least , 2 more transaction will have to be send out on uframe+1. Status have to be stored in Status of 0 and 1 of the same PTD. |
| 32-43 | NrBytesTransferred(11:0) | HW updates | This field indicates how many bytes are sent or received for this transaction. If Mult is greater than one, then it is possible to store intermediate results in this field. |
| 44-46 | NrBytesTransferred(12:14) | | Extend MSB to increased NrBytesTransferred to possible32K per PTD. |
| 44-50 | S-bytes(6:0) | | N.A for ISO |
| 51-54 | NakCnt(3:0) | | N.A for ISO |
| 55-56 | Cerr (1:0) | | Error Counter. This field corresponds to the Cerr field in the QH . This field is default 0 for isochronous transactions.<br><br>00 for ISO, N.A. |

FIG.7b

| 57 | Dt | | Set Data Toggle bit to start for the PTD ,. **** |
|---|---|---|---|
| 58 | P/E | | 0 N.A in ISO |
| 59 | SC | | 0 N.A. in ISO |
| 60 | Xtr | | Transaction Error, this has one bit for every uSOF, this bit is N.A here |
| 61 | B | | Babbling bit, refer to status for every uSOF. N.A. here |
| 62 | H | | Halt bit, refer to status for every uSOF. N.A. here. |
| 63 | A | | Active bit of the uSOF, refer to USA, N.A. here. |
| | End of W1 | | |
| W2 | | | OUT/IN INT |
| 0-7 | Usof Active (USCC) (7:0) | SW writes 0 → 1 <br><br> HW writes 1 → 0 after processed | For OUT Token <br> When the Frame number of bit W1(7-3) match the frame number of USB bus. These bits are check for 1 before they are sent for the uSOF <br> Example: <br> 1,1,1,1,1,1,1,1 : Send INT, b = 1 : entire ms <br> 0,1,0,1,0,1,0,1 : Send INT, b = 2 : 0, 2, 4 and 6 usof. <br> 1,0,0,0,1,0,0,0 : Send INT, b = 3 : every 4 usof. <br><br> After the H/W has proceed them, they will be reset by HW. <br> For INT TOKEN, <br> Only uSof 0 or1or2or3 can be set to 1 only. Nothing can be set for 4 and above |
| 8-10 | Status0 [2:0] | Reset to 0 initially | ISO IN/OUT status at usof 0: <br><br> Bit 2: UnderRun (OUT token only) <br> Bit 1: Babble (IN token only) <br> Bit 0: Transaction Error ( IN and OUT) |
| 11-13 | Status1 [2:0] | H/W | ISO IN/OUT status at usof 1 |
| 14-16 | Status2 [2:0] | H/W | ISO IN/OUT status at usof 2 |
| 17-19 | Status3 [2:0] | H/W | ISO IN/OUT status at usof 3 |
| 20-22 | Status4 [2:0] | H/W | ISO IN/OUT status at usof 4 |
| 23-25 | Status5 [2:0] | H/W | ISO IN/OUT status at usof 5 |
| 26-28 | Status6 [2:0] | H/W | ISO IN/OUT status at usof 6 |
| 29-31 | Status7 [2:0] | H/W | ISO IN/OUT status at usof 7 |
| Bytes received for each uSOF during iTD , ISO IN | | | |
| 39-32 | USCS_7..0 | SW writes 0 → 1 <br><br> HW reset after processed | All bits can be set to 1, for every transfer |
| 39-46 | Iso_IN_0 | H/W | Bytes received during usof 0, if active is set to 1 and frame number is correct. |
| 47-54 | Iso_IN_1 | H/W | Bytes received during usof 1, if active is set to 1 and frame number is correct. |

FIG.7c

| | | | |
|---|---|---|---|
| 55-63 | Iso_IN_2 | H/W | Bit(7:0), of the received bytes for usof 2. |
| W3 | Is used for ISO IN , to tell EHCI the number of bytes per USOF received. | | |
| 0-7 | Iso_IN_3 | H/W | Bytes received during usof 3, if active is set to 1 and frame number is correct |
| 8-15 | Iso_IN_4 | H/W | Bytes received during usof 4, if active is set to 1 and frame number is correct |
| 16-23 | Iso_IN_5 | H/W | Bytes received during usof 5 (bit3:0), if active is set to 1 and frame number is correct |
| 24-31 | Iso_IN_5 | H/W | Bit(7:0) of usof 5, bytes received |
| 32-39 | Iso_IN_6 | H/W | Bytes received during usof 6, if active is set to 1 and frame number is correct |
| 40-47 | Iso_IN_7 | H/W | Bytes received during usof 7, if active is set to 1 and frame number is correct |

FIG.7d

Interrupt OUT/IN Start/Complete Split

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|---|---|---|---|---|---|---|---|---|---|
| X | | | | | | | | | | | | | | | | | | | | | | | | | | | | | X | X | V | W0 (31-0) |
| | | | | | | | | | | | | | | | | NBytesToTransfer | | | | | | | | | | | | | | | | W1 (31-0) |
| BP<br>S | E<br>C<br>S | C<br>S<br>E | RL<br>no ping for FS | | | | Ex | | | | | | | | | Data Start Address | | | | | | | | Ms Polling rate by Bit 7:3<br>Bit 2:0 = XXX | | | | | | | | W2 (31-0) |
| Status [2:0]<br>usof7 | | | Status [2:0]<br>usof6 | | | Status [2:0]<br>usof5 | | | Status [2:0]<br>usof4 | | | Status [2:0]<br>usof3 | | | Status [2:0]<br>usof2 | | | Status [2:0]<br>usof1 | | | Status [2:0]<br>usof0 | | | us<br>ss<br>7 | us<br>ss<br>6 | us<br>ss<br>5 | us<br>ss<br>4 | us<br>ss<br>3 | us<br>ss<br>2 | us<br>ss<br>1 | us<br>ss<br>0 | W3 (31-0) |

| 63 | 62 | 61 | 60 | 59 | 58 | 57 | 56 | 55 | 54 | 53 | 52 | 51 | 50 | 49 | 48 | 47 | 46 | 45 | 44 | 43 | 42 | 41 | 40 | 39 | 38 | 37 | 36 | 35 | 34 | 33 | 32 | |
|---|---|---|---|---|---|---|---|---|---|---|---|---|---|---|---|---|---|---|---|---|---|---|---|---|---|---|---|---|---|---|---|---|
| NBytesReceived_CS_IN_6 | | | | | | | | NBytesReceived_CS_IN_5 | | | | | | | | NBytesReceived_CS_IN_4 | | | | | | | | NBytesReceived_CS_IN_3 | | | | | 34-31<br>EndPt | | | W0 (63-32) |
| Hub Address | | | | | | | | PortNumber | | | | | | | | XX | | L | S | EP<br>Type | | Token | | Device Address | | | | | | | | W1 (63-32) |
| A | H | B | Xtr | P/<br>SC | dt<br>E | Ceer | | NakCnt, no<br>need for SITD | | | | | | | | S-Bytes for QHPSplit, no<br>need for SITD | | | | | | | | NBytesTransferred<br>4K, for FS/LS Speed only, INTerrupt | | | | | | | | W2 (63-32) |
| NBytesReceived_CS_IN_2 | | | | | | | | NBytesReceived_CS_IN_1 | | | | | | | | NBytesReceived_CS_IN_0 | | | | | | | | NBytesReceived_CS_IN_7 | | | | | | | | W3 (63-32) |

FIG.8

BUS CONTROLLER FOR HANDLING SPLIT TRANSACTIONS

This invention relates to a bus controller, and in particular to a device which can be included in electronic equipment in order to control the transfer of data to and from other electronic equipment using an external bus.

It is becoming common for electronic equipment to be provided with interfaces allowing for the transmission of data using a Universal Serial Bus (USB).

When items of electronic equipment are interconnected using the USB system, one item of equipment is designated as the USB Host, while the other items are designated as USB Devices. It is the USB Host which is responsible for initiating and scheduling communications over the USB. For example, the USB Host may be a personal computer (PC), and it may be connected to various USB Devices, such as a printer, a digital camera and a personal digital assistant (PDA).

However, it is also possible to use a USB connection to connect, for example, a camera directly to a printer without requiring connection through a PC. In order to be able to function as a USB Host, an item of equipment, which may be the camera in this example, must be provided with the required functionality, and the present invention relates more particularly to a device, in the form of an integrated circuit, which can be included in an item of equipment, in order to provide it with this functionality. However, it will be appreciated that the item of equipment has other functions, and its USB interconnectivity is only a small part of its functionality. Moreover, it is desirable to be able to include the device into items of equipment, in order to provide them with the ability to act as a USB Host, without requiring those items of equipment to have especially powerful processors.

It is therefore desirable for the device to be able to operate with the smallest possible dependence on the central processing unit (CPU) of the item of equipment in which it is to be incorporated. For example, the device preferably operates as a slave in the bus system of the item of equipment, allowing the CPU to remain as the bus master. Further, it is desirable for the device to place the smallest possible processing burden on the CPU, and in particular to minimize the number of interrupt requests to the CPU. Further, the device should not depend on the CPU using any particular operating system, so that the device can be incorporated in the widest possible range of the items of equipment.

According to the present invention, there is provided a host controller, in which Start and Complete Split transactions are handled automatically, without requiring any intervention by the CPU. In particular, the transfer of a payload is handled using a single transfer descriptor, and data can be transferred until the whole payload has been transferred.

In the Figures:

FIGS. 4 and 5a-b illustrate a first transfer descriptor in accordance with the present invention.

FIGS. 6 and 7a-d illustrate a second transfer descriptor in accordance with the present invention.

Figure 1:
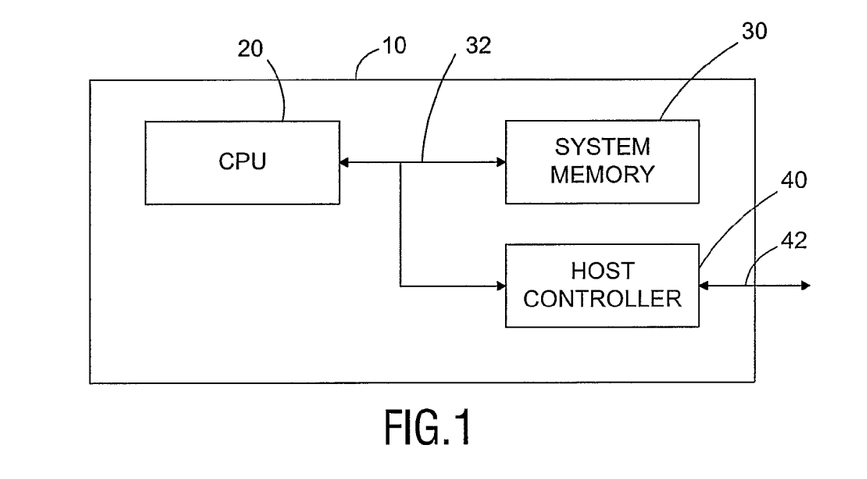
FIG. 1 is a block schematic diagram of an item of electronic equipment, incorporating a host controller in accordance with the present invention.

FIG. 1 is a block schematic diagram of the relevant parts of an item 10 of electronic equipment, operating as a USB host. The invention is particularly applicable to devices such as cameras, set-top boxes, mobile phones, or PDAs, in which the functional limitations of the microprocessor and the system memory are more relevant, rather than in personal computers (PCs). However, the invention is applicable to any device which can operate as a USB host.

It will be apparent that the device 10 will have many features, which are not shown in FIG. 1, since they are not relevant to an understanding of the present invention.

The device 10 has a host microprocessor (CPU) 20, which includes a processor core. The CPU 20 is connected to a system memory 30 by means of a peripheral bus 32.

A host controller 40 is also connected to the host microprocessor 20 and the system memory 30, by means of the peripheral bus, or memory bus, 32. The host controller 40 has an interface for a USB bus 42, through which it can be connected to multiple USB devices. In this illustrated embodiment, the host controller 40 is a USB 2.0 host controller, and features of the host controller not described herein may be as specified in the USB 2.0 specification.

As is conventional, the host controller 40 is adapted to retrieve data which is prepared by the processor 20 in a suitable format, and to transmit the data over the bus interface. In USB communications, there are two categories of data transfer, namely asynchronous transfer and periodic transfer. Control and bulk data are transmitted using asynchronous transfer, and isochronous and interrupt data are transmitted using periodic transfer. A Queue Transaction Descriptor (qTD) data structure is used for asynchronous transfer, and an Isochronous Transaction Descriptor (iTD) data structure is used for periodic transfer.

The processor 20 prepares the data in the appropriate structure, and stores it in the system memory 30, and the host controller 40 must then retrieve the data from the system memory 30.

Figure 2:
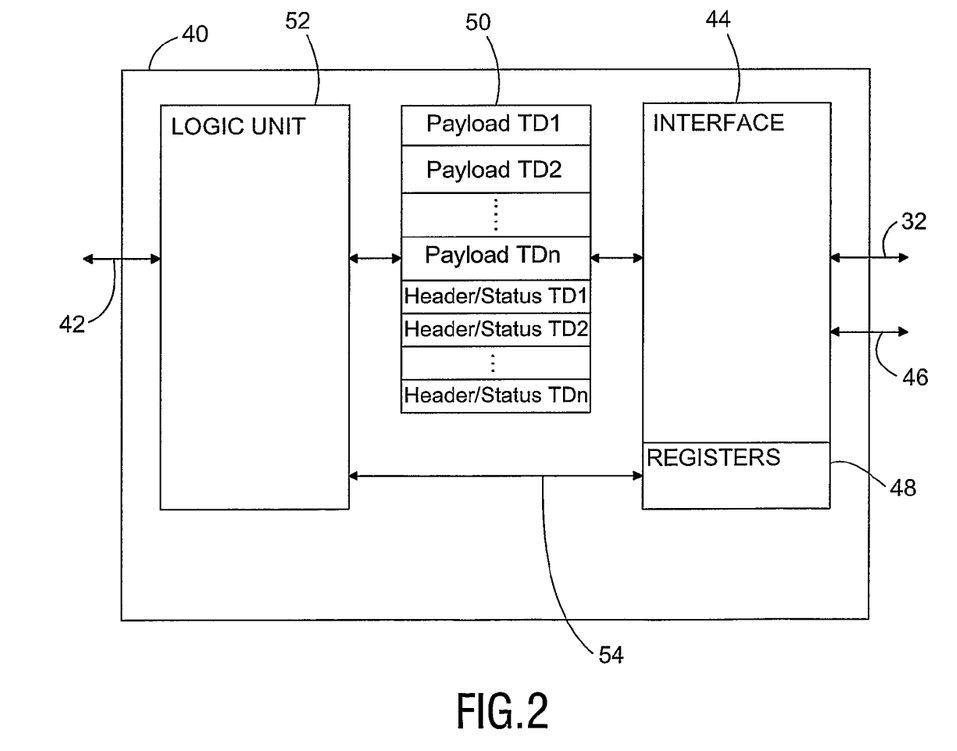
FIG. 2 is a block schematic diagram of a host controller in accordance with the present invention.

FIG. 2 shows in more detail the structure of the embedded USB host controller 40.

As mentioned above, the host controller 40 has a connection for the memory bus 32, which is connected to an interface 44, containing a Memory Management Unit, a Slave DMA Controller, an interrupt control unit, and hardware configuration registers. The interface 44 also has a connection 46 for control and interrupt signals, and registers 48 which support the RAM structure and the operational registers of the host controller 40.

The interface 44 is connected to the on-chip RAM 50 of the host controller, which in this preferred embodiment is a dual port RAM, allowing data to be written to and read from the memory simultaneously, but could equivalently be a single port RAM with an appropriate arbiter. The memory 50 is connected to the host controller logic unit 52, which also contains an interface for the USB bus 42. Control signals can be sent from the registers 48 to the logic unit 52 on an internal bus 54.

Figure 3:
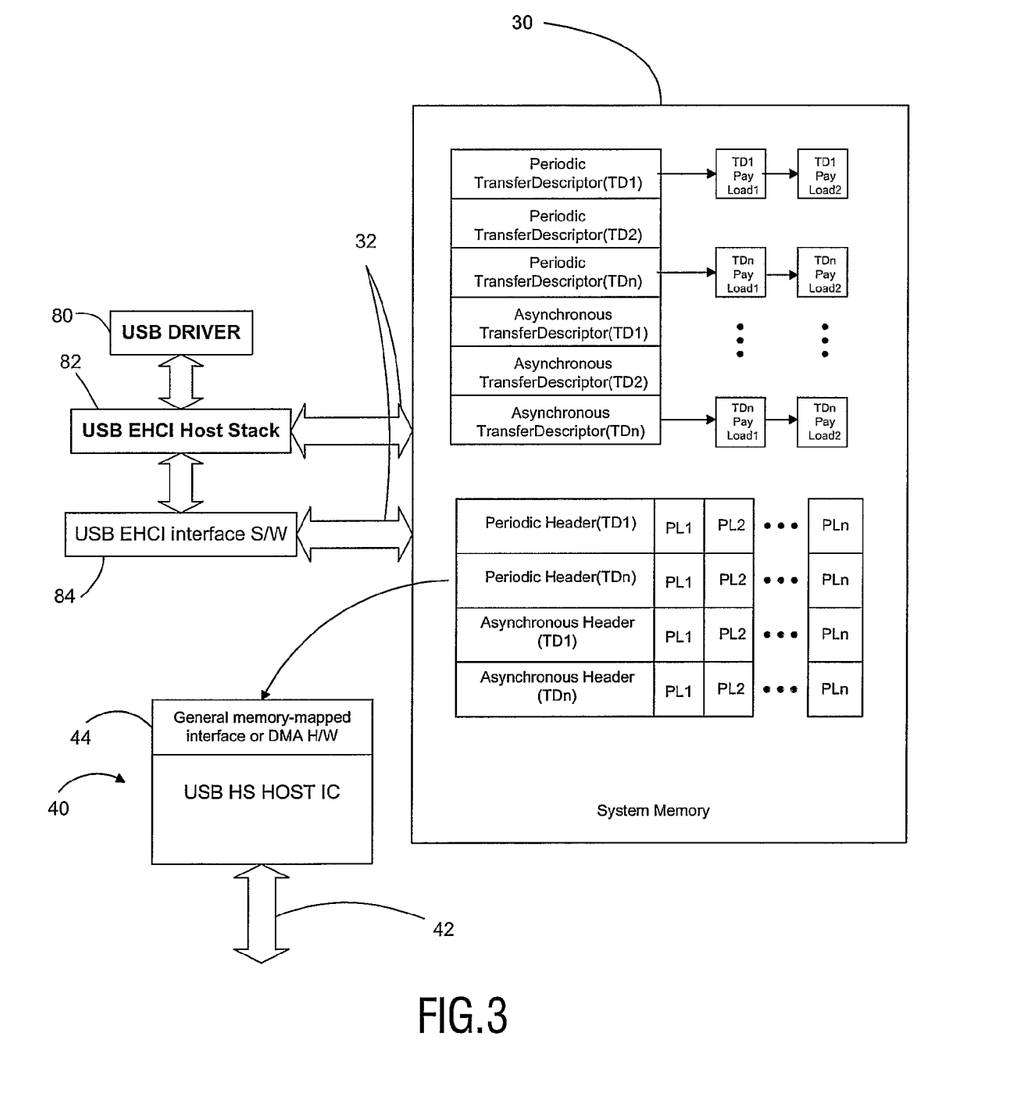
FIG. 3 is an illustration showing the structure of software in the host controller of FIG. 2.

FIG. 3 is a schematic diagram showing in part the software operating on the host controller 40, in order to illustrate the method of operation of the device according to the invention.

The host controller 40 runs USB driver software 80 and USB Enhanced Host Controller Interface software 82, which are generally conventional.

The host controller 40 also runs USB EHCI interface software 84, which prepares a list of transfer-based transfer descriptors for every endpoint to which data is to be transmitted.

The EHCI interface software 84 is written such that it uses the parameters which are generated by the EHCI host stack 82 for the existing periodic and asynchronous headers, and can be used for all different forms of USB transfer, in particular high speed USB transfer, such as high speed isochronous, bulk, interrupt and control and start/stop split transactions.

The host microprocessor 20 writes the transfer-based transfer descriptors into the RAM 50 of the host controller 40 through the peripheral bus 32, without the host controller 40 requiring to master the bus 32. In other words, the host controller 40 acts only as a slave. The transfer-based transfer descriptors can then be memory-mapped into the RAM 50 of the host controller 40.

Advantageously, the built-in memory 50 of the host controller 40 is mapped in the host microprocessor 20, improving the ease with which transactions can be scheduled from the host microprocessor 20.

The use of a dual-port RAM 50 means that, while one transfer-based transfer descriptor is being executed by the host controller 40, the host microprocessor 20 can be writing data into another block space.

As mentioned above, the host controller 40 is a USB 2.0 host controller, able to transfer data over a high speed bus as defined in the USB 2.0 specification. However, the host controller 40 is also able to transfer data to full speed and low speed devices, as defined in the USB specifications. Specifically, data is sent using Start and Complete Split transactions via a hub. The hub may then be connected to the items of equipment which are not able to be connected to the high speed bus.

According to the present invention, Start and Complete Split transactions are handled by means of a single transfer descriptor. More specifically, a single transfer descriptor can handle both Start Split (SS) and Complete Split (CS) transactions for the transfer of the entire payload. The software only needs to indicate whether the SS/CS transfer descriptor is a bulk/control/ISO/interrupt transfer for a full speed (FS) or low speed (LS) endpoint, with its Hub address, port number, Device and endpoint number.

In the case of a bulk transaction, the hardware will deliver the start split transaction, wait for acknowledgement (ACK) from the hub, and then use this ACK to reset the initial Start Split transaction into a Complete Split transaction. Subsequent Start Split and Complete Split transactions for the active transfer descriptor are activated by the hardware until all the data specified by the transfer descriptor has been sent or received. Thus, for example, in the case, where the payload size is 256, and the maximum packet size is 64, the hardware will generate four sets of SS/CS transactions in order to complete the transfer of the entire payload specified in the transfer descriptor, without intervention by the CPU.

As is conventional Start and Complete Split transfers can start at any time after the isochronous and interrupt transfer descriptors have been completed for one micro-frame. More details of SS/CS transactions are given in the USB 2.0 Specification, for example at section 11.17.

Figure 4:
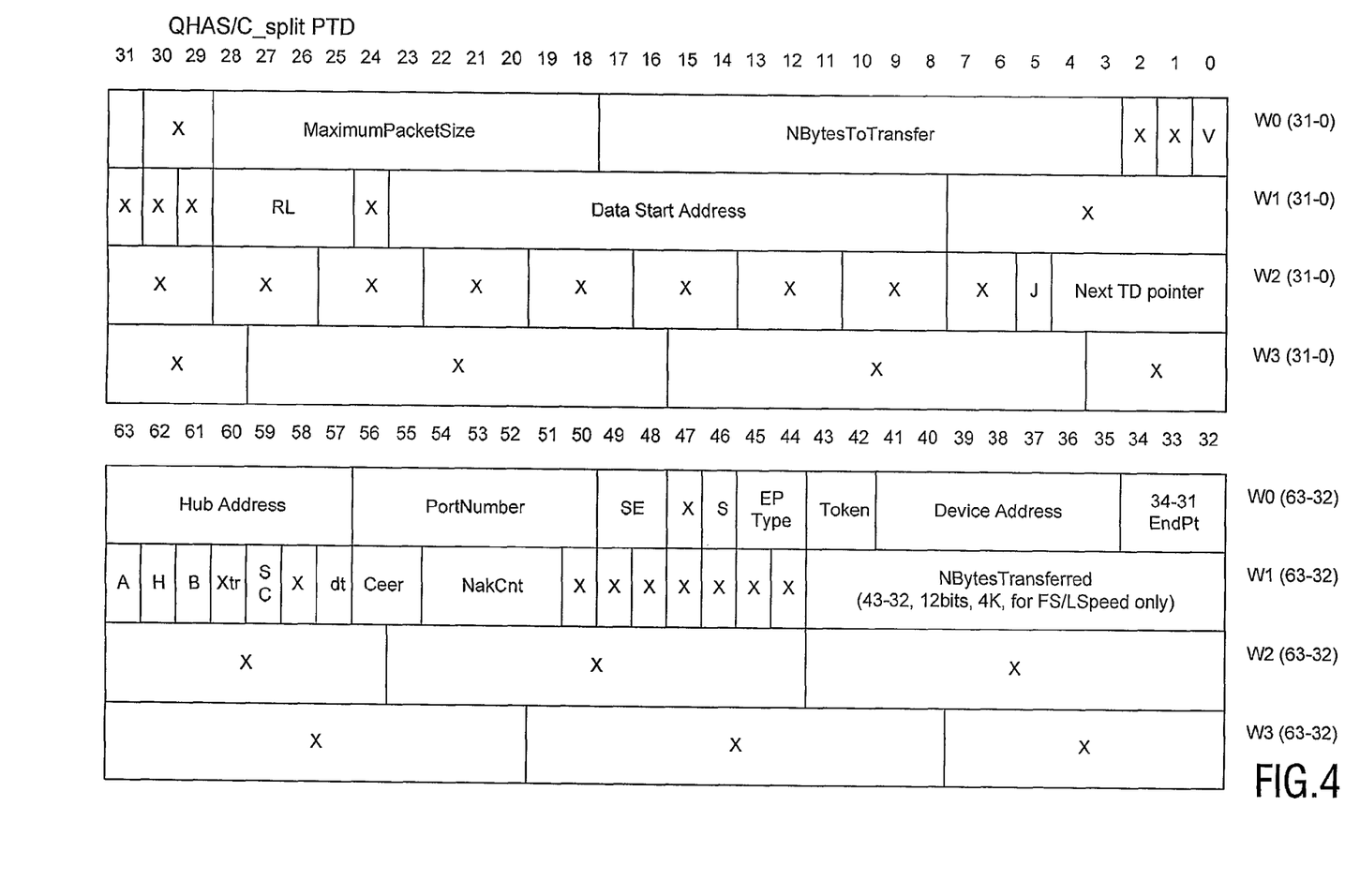

FIG. 4 shows the structure of a transfer descriptor for high speed transfer of bulk data by means of Start and Complete Split transactions, and FIG. 5 (divided into FIGS. 5a and 5b) gives the detailed definition of the transfer descriptor shown in FIG. 4.

Thus, each transfer descriptor relating to Start Split and Complete Split bulk transfers can transfer up to 4K of data to the FS/LS device without the intervention of CPU. In the event of three consecutive NAKs, the hardware will stop the transaction, and generate an interrupt request to the CPU. The general conditions for error and NAK handling by the hardware are in accordance with USB 2.0 spec 11.17.

Figure 6:
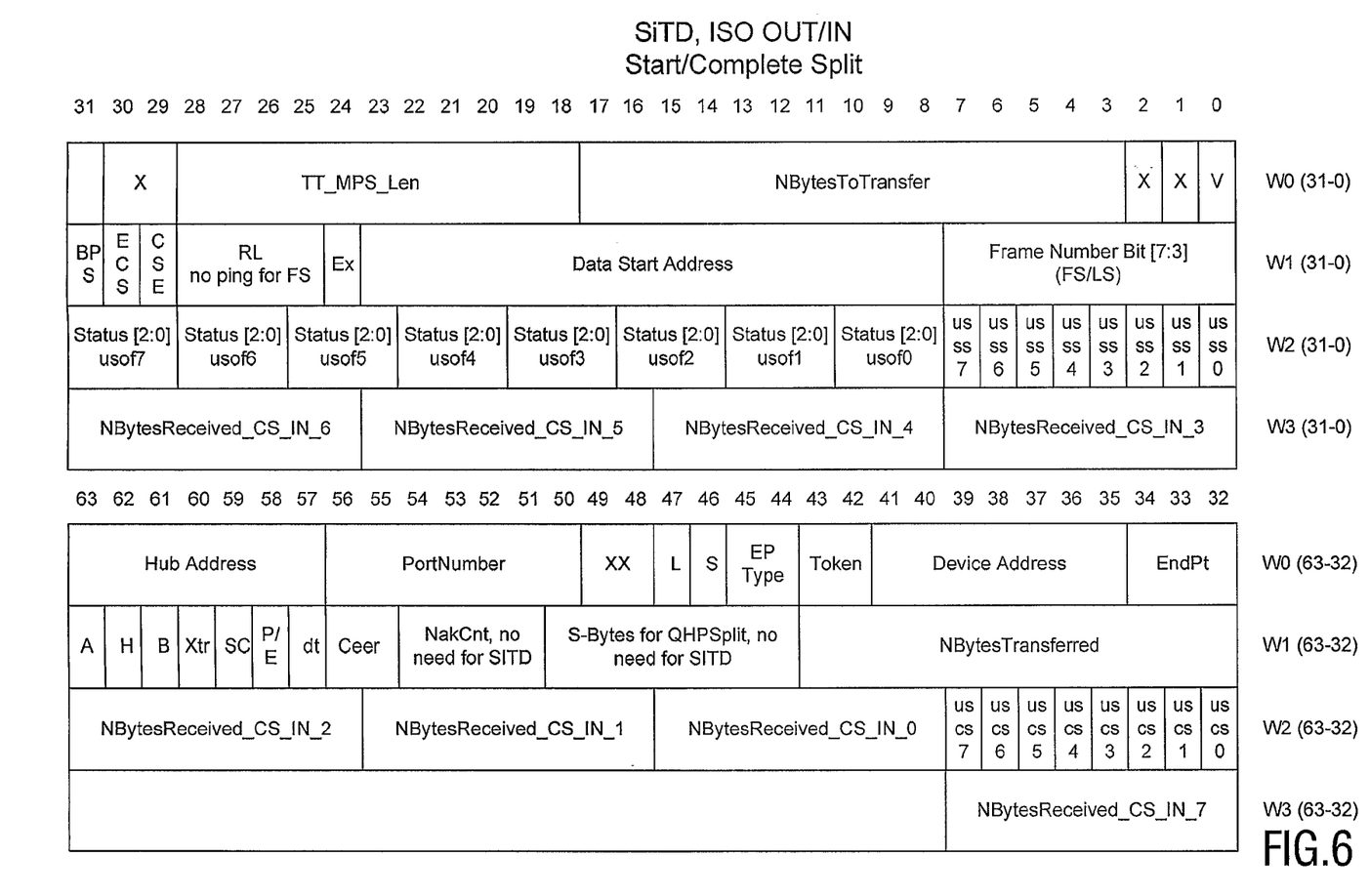
Figure 7D:
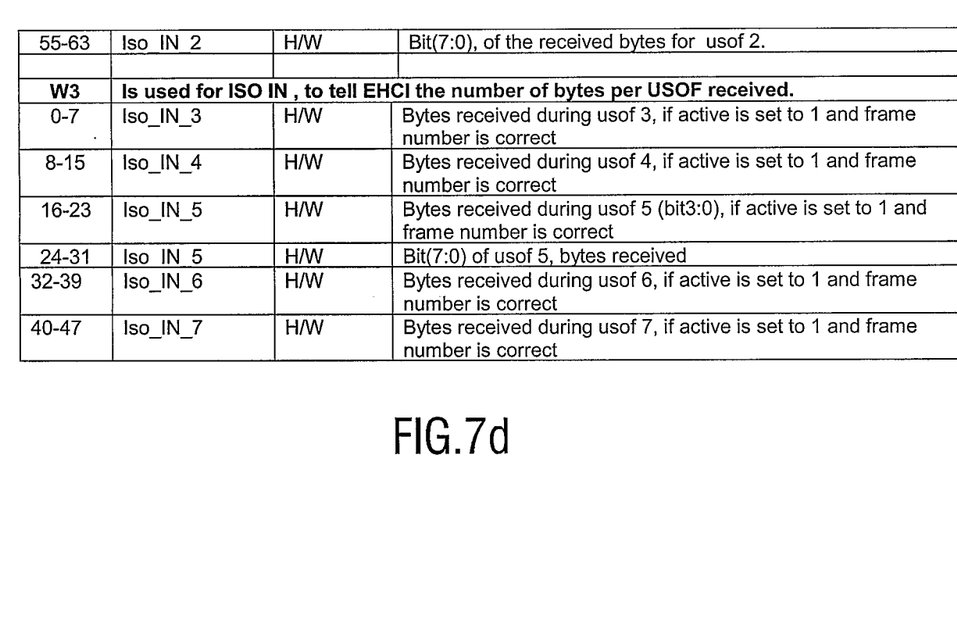

FIG. 6 shows the structure of a transfer descriptor for high speed transfer of isochronous data by means of Start and Complete Split transactions, and FIG. 7 (divided into FIGS. 7a, 7b, 7c and 7d) gives the detailed definition of the transfer descriptor shown in FIG. 6.

Thus, a single Start Split and Complete Split transfer descriptor for an isochronous endpoint can handle up to 1k of data to the device.

Figure 8:
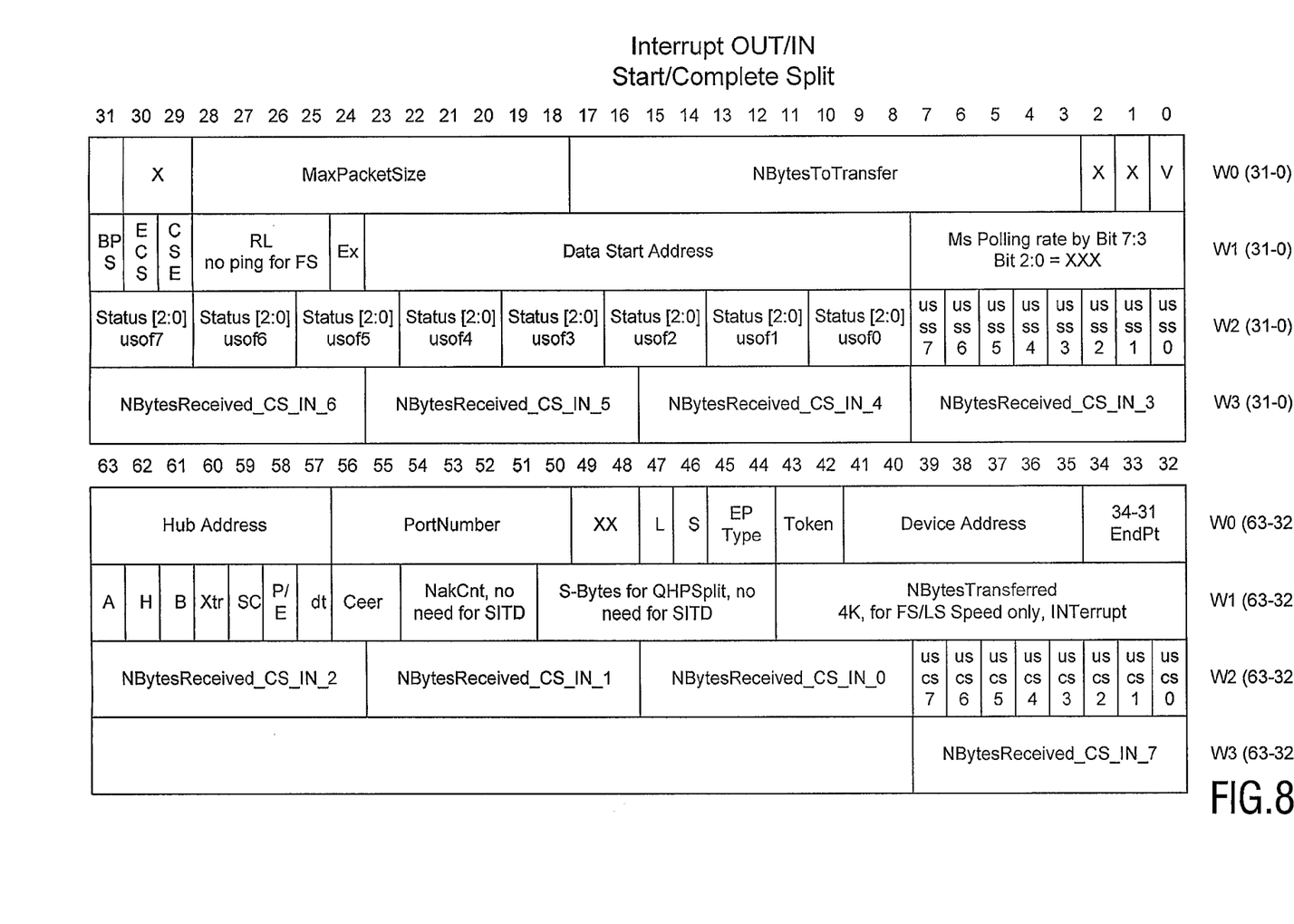
FIG. 8 illustrates a third transfer descriptor in accordance with the present invention.

FIG. 8 shows the structure of a transfer descriptor for high speed transfer of interrupt data by means of Start and Complete Split transactions. The detailed definition of the transfer descriptor shown in FIG. 8 is the same as that shown in FIG. 7, except that the parameter MaxPacketSize is used. The MaxPacket Size is the MPS of the FS/LS device. And the total bytes to be sent and received can be greater than MPS. In this case, the parameter Uframe is the polling rate in ms. The value of the parameter indicating the number of Total bytes to send is not restricted to 1023 as in FIG. 7. It should also be noted that this parameter is also not restricted to 1023 for Start Split of Bulk Transfer.

The transfer descriptors also allow the setting of an active bit, indicating a specific micro-frame in which a transaction will be processed. Thus, US SS=0000 0001, US CS=0000 0100 will cause the Start Split transaction to execute in micro-frame 0, and the Complete Split transaction to execute in micro-frame 2.

There is therefore described a device which allows the execution of split transactions, without requiring CPU intervention.

The invention claimed is:

1. A device that executes split transactions, the device comprising:
   a host microprocessor;
   a system memory connected to the host microprocessor, wherein the host microprocessor transfers data to the system memory over a peripheral bus;
   a Universal Serial Bus (USB) host controller connected to the host microprocessor and the system memory, wherein the USB host controller retrieves the data from the system memory and comprises:
      an on-chip RAM connected to an interface, the on-chip RAM storing transfer descriptors sent from the host microprocessor,
      registers that support the RAM, and
      a host controller logic unit connected by an internal bus to the registers, wherein the USB host controller executes a single transfer descriptor from the on-chip RAM to transfer an entire USB payload across the interface and the transfer involves an amount of data specified by the single transfer descriptor without intervention by the host microprocessor;
   wherein the single transfer descriptor handles both Start Split (SS) and Complete Split (CS) transactions.

2. The device of claim 1, wherein, for a bulk transaction in which the data are transmitted via a hub for both SS and CS transactions, the device receives an acknowledgement message from the hub, and resets SS transactions into CS transactions in response to the acknowledgement message.

3. The device of claim 1, wherein the device uses the single transfer descriptor to transfer up to 4K of the data to an endpoint device without intervention of the host microprocessor.

4. The device of claim 1, wherein the on-chip RAM is a dual-port RAM.

5. The device of claim 4, wherein the host microprocessor writes the data into a block while the USB host controller executes the transfer descriptor.

6. A method of transferring Universal Serial Bus (USB) data with a host controller, the method comprising:

using a host microprocessor to transfer data to a system memory over a peripheral bus;

using a USB host controller to retrieve the data from the system memory;

using an on-chip RAM in the USB host controller to store transfer descriptors sent from the host microprocessor;

using the USB host controller to execute a single transfer descriptor from the on-chip RAM to transfer an entire USB payload across an interface, wherein the transfer involves an amount of data specified by the single transfer descriptor without intervention by the host microprocessor; and handling both Start Split (SS) and Complete Split (CS) transactions with the single transfer descriptor.

7. The method of claim 6, for a bulk transaction in which the data are transmitted via a hub for both SS and CS transactions, further comprising:

receiving an acknowledgement message from the hub; and resetting SS transactions into CS transactions in response to the acknowledgement message.

8. The method of claim 6, further comprising:

using the single transfer descriptor to transfer up to 4K of the data to an endpoint device without intervention of the host microprocessor.

9. The method of claim 6, wherein the on-chip RAM is a dual-port RAM.

10. The method of claim 9, further comprising:

writing the data into a block with the host microprocessor while the host controller executes the transfer descriptor.

11. A Universal Serial Bus (USB) host controller that handles split transactions, wherein the USB host controller comprises:

an on-chip RAM connected to an interface, the on-chip RAM storing transfer descriptors sent from a host microprocessor;

registers that support the RAM; and a host controller logic unit connected by an internal bus to the registers, wherein the USB host controller executes a single transfer descriptor from the on-chip RAM to transfer an entire USB payload across the interface, the transfer involving an amount of data specified by the single transfer descriptor without any intervention by the host microprocessor;

wherein the single transfer descriptor handles both Start Split (SS) and Complete Split (CS) transactions.

12. The host controller of claim 11, wherein, for a bulk transaction in which the data are transmitted via a hub for both SS and CS transactions, the host controller receives an acknowledgement message from the hub, and resets SS transactions into CS transactions in response to the acknowledgement message.

13. The host controller of claim 11, wherein the host controller uses the single transfer descriptor to transfer up to 4K of the data to an endpoint device without intervention of the host microprocessor.

14. The host controller of claim 11, wherein the on-chip RAM is a dual-port RAM.

15. The host controller of claim 14, wherein the host microprocessor writes the data into a block while the USB host controller executes the transfer descriptor.

* * * * *